3,158,618
N-(ACYLAMINO)-EPHEDRINES
Donald L. Trepanier, Indianapolis, Ind., assignor to The Dow Chemical Company, Midland, Mich., a corporation of Delaware
No Drawing. Filed May 14, 1962, Ser. No. 194,691
5 Claims. (Cl. 260—295)

This invention is concerned with novel hydrazine compounds and is particularly directed to N-aminoephedrines and to N-(acylamino) derivatives of ephedrine and to a method for the preparation thereof.

The new compounds are N-aminoephedrines and N-(acylamino) ephedrines having the formula:

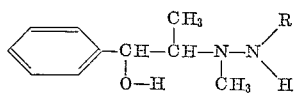

wherein R represents hydrogen or an acyl group of the formula

in which Z is an aliphatic, aromatic or heterocyclic radical. More particularly, Z may be a tertiary alkyl radical such as tertiary butyl, a phenyl radical, a substituted phenyl radical bearing from one to three substituents selected from fluorine, chlorine, bromine, lower alkyl radicals and lower alkoxy radicals or a heterocyclic radical such as pyridyl, thienyl or furyl radical. The N-aminoephedrines and N-(acylamino) ephedrines are crystalline solids somewhat soluble in organic solvents, such as chlorinated hydrocarbons, aliphatic alcohols and dialkyl ethers, and substantially insoluble in water. The novel compounds are basic in nature and may be employed in the form of the free base or as the salts thereof, particularly with mineral acids such as hydrochloric acid. It will be noted that Formula I above contains 2 asymmetric carbon atoms and the compounds represented thereby can thus exist as various diastereomers. Unless otherwise specifically indicated, the term "ephedrines" as employed herein refers to and is inclusive of the various diastereomeric forms of 1-phenyl-2-(methylamino)propanol such as di- and l-ephedrine and d- and l-pseudoephedrine.

The N-amino-ephedrines are essential intermediates employed in preparing the N-(acylamino) compounds of the invention and may be prepared by reduction of the corresponding N-nitrosoephedrines. The latter are produced by reacting substantially equimolar proportions of nitrous acid and ephedrine at a low temperature in an acidic, aqueous medium. In carrying out the reaction for the production of the N-nitroso-ephedrine, it is convenient to employ an aqueous solution of ephedrine hydrochloride, cooled to about 0° C., and containing sufficient excess concentrated hydrochloric acid to generate nitrous acid in situ when a solution of sodium nitrite is added thereto. Any suitable reducing agent can be employed to reduce the N-nitroso-ephedrine to the desired N-aminoephedrine. Good results have been obtained when employing lithium aluminum hydride in suspension or finely-divided zinc acetic acid to accomplish such reduction.

The N-(acylamino) ephedrine compounds of the invention have been found particularly useful as essential intermediates for the preparation of a new class of substituted 6-phenyl-5,6-dihydro-1,3,4-oxadiazine compounds. Compounds of the latter class useful as active pharmacological agents are disposed and claimed in my copending application, Serial No. 194,692, filed concurrently herewith.

The novel N-(acylamino)ephedrines may be prepared by heating N-amino-ephedrine or N-amino-pseudo-ephedrine with a substantially equimolar proportion of an acyl chloride. The reaction proceeds readily when the reactants are contacted and heated, preferably in an inert, organic solvent, and proceeds with the splitting out of hydrogen chloride of reaction. In general, it is desirable to carry out the reaction in a medium containing an acid binding agent such as an alkali metal hydroxide or carbonate or a tertiary amine such as pyridine or quinoline. On completion of the reaction, the desired reaction product may be isolated by conventional procedures such as filtration, extraction and crystallization.

The following examples illustrate the invention but are not to be construed as limiting the same.

EXAMPLE 1

*Preparation of N-Nitroso-1-Ephedrine*

A solution of 101 grams (0.5 mole) of l-ephedrine hydrochloride and 1 milliliter of concentrated hydrochloric acid in 500 milliliters of water was cooled to 0° C., and a solution of 35 grams (0.5 mole) of sodium nitrite in 70 milliliters of water added thereto portionwise with stirring over a period of 20 minutes. During the addition of the sodium nitrite solution, 10 milliliters of concentrated hydrochloric acid was added, portionwise, to maintain the solution acidic. The mixture was stirred and kept at 0°–5° C. for 6 hours and then suction filtered. The solid product so obtained was allowed to air dry and was found to melt over a range of 85°–88° C. A portion of this product was recrystallized twice from water and dried to obtain the desired N-amino-ephedrine as a crystalline solid, melting at 91°–92° C. and containing by weight 61.96 percent carbon, 7.39 percent hydrogen and 14.51 percent nitrogen by analysis as compared to theoretical values of 61.83 percent carbon, 7.26 percent hydrogen and 14.43 percent nitrogen calculated for the assigned structure.

EXAMPLE 2

*Preparation of N-Amino-l-Ephedrine*

To a stirred suspension of 22.8 grams (0.6 mole) of LiAlH$_4$ in 200 milliliters of ether there was added, dropwise, a solution of 38.8 grams (0.2 mole) of N-nitroso-l-ephedrine in 1000 milliliters of ether. The resulting mixture was heated under reflux with stirring for 36 hours and then cooled and treated with 500 milliliters of wet ether followed by the dropwise addition of 50 milliliters of water. The mixture was suction filtered and the separated solid washed thoroughly with 500 milliliters of isopropyl alcohol. The combined filtrate and wash solution was distilled in vacuo, and the fraction boiling at 138°–150° C. under 0.05–0.75 mm. was collected. This material solidified in the distilling receiver and was found to melt at 54°–57° C. A portion of the latter product was dissolved in ether and treated with hydrogen chloride to precipate the hydrochloride salt thereof. The N-amino-ephedrine hydrochloride product was recrystallized from a mixture of isopropyl alcohol and ether and was found to melt at 100°–106° C.

EXAMPLE 3

*Alternative Preparation of N-Amino-l-Ephedrine*

To a stirred suspension of 130 grams (2 moles) of zinc metal dust in 200 milliliters of water, cooled in an ice bath, there was added over a period of 45 minutes a solution of 97 grams (0.5 mole) of N-nitrosoephedrine in 900 milliliters of glacial acetic acid. During the addition, the temperature of the reaction mixture was maintained at 20—25° C. by external cooling. After the addition was completed, the mixture was stirred at 50° C. for 1 hour, suction filtered, and the zinc washed with a mixture of 150 milliliters of water and 50 milliliters of glacial acetic acid. The combined filtrate and wash solution was concentrated to a volume of 500 milliliters in vacuo, 250 milliliters of water was added, and the solution was again concentrated to a volume of 500 milliliters in vacuo. The ice-cooled solution was made alkaline by the addition of a cold solution of 350 grams of sodium hydroxide in 800 milliliters of water. The alkaline mixture was extracted four times with 400-milliliter portions of ether. The combined ether extracts were dried over anhydrous sodium sulfate and evaporated in vacuo leaving 83 grams (90 percent yield) of yellow oil which crystallized upon standing. The crystalline product melted at 55°–57° C. and exhibited an infrared spectrum identical with the spectrum of the N-amino-l-ephedrine produced by the method of Example 2.

EXAMPLE 4

72 grams (0.4 mole) of N-amino-l-ephedrine was dissolved in 250 milliliters of dry benzene and 68 grams (0.4 mole) of 2-methoxybenzoyl chloride added thereto dropwise with stirring. The resulting mixture was stirred and heated at a temperature of 90° C. for 6 hours and thereafter maintained at room temperature overnight. Following the above reaction period, the mixture was cooled, made alkaline by addition of a cold solution of 50 grams of sodium hydroxide in 250 milliliters of water and extracted 4 times with chloroform, using 150 milliliters of chloroform for each extraction. The combined chloroform extracts were washed with water, dried over anhydrous sodium sulfate and evaporated under vacuum to obtain the crude reaction product as a solid, melting at 97°–100° C. This product was crystallized from isopropyl ether to obtain a 1-methyl-1(1-methyl-2-hydroxy-2-phenylethyl) - 2 - (2-methoxybenzoyl) hydrazine product, melting at 115°–116° C.

EXAMPLE 5

A mixture of 100 grams (0.74 mole) of 2-methylbenzoic acid and 250 milliliters of thionyl chloride was heated under reflux for 2 hours. Thereafter, excess thionyl chloride was distilled off from the mixture under reduced pressure, 100 milliliters of benzene was added, the benzene distilled off under vacuum and this process of adding and distilling off benzene repeated twice more to insure the complete removal of thionyl chloride. The resulting residue was dissolved in benzene and added dropwise to a stirred mixture of 133 grams (0.74 mole) of N-amino-l-ephedrine, 58 grams (0.74 mole) of pyridine and 300 milliliters of benzene. The resulting mixture was stirred and heated under reflux for 18 hours. The reaction mixture was then cooled, made alkaline by addition of a solution of 40 grams of sodium hydroxide in 300 milliliters of water and extracted with chloroform as in Example 4. The chloroform extract was washed with water and dried over anhydrous magnesium sulfate. The dried chloroform extract was evaporated to dryness under vacuum, leaving a brown, oily product as a residue, which crystallized when triturated with a small amount of diethyl ether. The resulting crystalline solid was recrystallized from aqueous ethanol to obtain a 1-methyl-1(1-methyl-2-hydroxy-2-phenylethyl) - 2 - (2 - methylbenzoyl) hydrazine product, melting at 130°–131° C.

EXAMPLE 6

72 grams (0.4 mole) of N - amino - l - ephedrine was mixed with 150 milliliters of benzene and 68 grams (0.4 mole) of 4-methoxybenzoyl chloride added thereto dropwise with stirring. The resulting mixture was stirred and heated on a water bath at 90° C. for 4 hours, stirred at room temperature overnight, cooled and suction filtered. The solid product so obtained was washed with ether and air-dried to obtain a 1-methyl-1(1-methyl-2-hydroxy-2-phenylethyl)-2-(4-methoxybenzoyl) hydrazine hydrochloride product having a melting point of 192°–197° C. with decomposition.

EXAMPLE 7

Following the procedure of Example 1, an acidic aqueous solution of d-pseudoephedrine hydrochloride was treated with sodium nitrite to produce N-nitroso-d-pseudoephedrine as a white, crystalline solid, melting at 84°–86° C. The latter was dissolved in glacial acetic acid and reduced by the method of Example 3 to produce N-amino-d-pseudoephedrine as an oily, yellow liquid in a yield of 91 percent of theoretical. The oily liquid was reacted with benzoyl chloride by the method of Example 6 to produce a 1-methyl-1(1-methyl-2-hydroxy-2-phenylethyl)-2-(benzoyl) hydrazine hydrochloride product as a white solid, melting at 178°–179° C. with decomposition.

EXAMPLE 8

Following the procedure of Example 4, (A) 3,4,5-trimethoxybenzoyl chloride, (B) 2-ethoxybenzoyl chloride and (C) diphenylacetyl chloride, respectively, were individually reacted with N-amino-ephedrine and the products isolated as in Example 4 to obtain the following respective acyl hydrazines: (A) 1-methyl-1(1-methyl-2-hydroxy-2-phenylethyl)-2-(3,4,5 - trimethoxybenzoyl) hydrazine, melting at 170°–171° C., (B) 1-methyl-1(1-methyl-2-hydroxy-2-phenylethyl)-2-(2-ethoxybenzoyl) hydrazine, melting at 152°–154° C. and (C) 1-methyl-1(1-methyl-2-hydroxy-2-phenylethyl)-2 - (diphenylacetyl) hydrazine, melting at 173°–174° C.

EXAMPLE 9

The procedure of Example 5 was repeated except that, in place of 2-methylbenzoyl chloride, there was used (A) benzoyl chloride, (B) 4-chlorobenzoyl chloride, (C) 3-methylbenzoyl chloride, (D) 2,3-dimethoxybenzoyl chloride, (E) 2,6-dimethoxybenzoyl chloride or (F) 3,5-dimethoxybenzoyl chloride and the respective products were isolated as in said example. Each such product was a 1-methyl-(1-methyl-2-hydroxy-2-phenyl-ethyl)-2(acyl)-hydrazine. The melting points characteristic of the respective products are listed in the following table.

| Acyl substituent in hydrazine product: | Melting point, ° C. |
|---|---|
| A. Benzoyl | 169–170.5 |
| B. 4-chlorobenzoyl | 137–138 |
| C. 3-methylbenzoyl | 148–149.5 |
| D. 2,3-dimethoxybenzoyl | 138–139 |
| E. 2,6-dimethoxybenzoyl | 169–171 |
| F. 3,5-dimethoxybenzoyl | 157–160 |

Carbon and hydrogen analyses of each of the latter compounds were in proper agreement with the theoretical values for said compounds.

EXAMPLE 10

In further syntheses, the procedure of Example 6 was followed substituting, for the 4-methoxybenzoyl chloride of said example, each of the acyl chlorides, respectively, as set forth in the following table, together with the melting points of the corresponding acyl hydrazine hydrochloride produced.

| Acyl chloride employed: | Melting point, ° C., of acyl hydrazine hydrochloride products |
|---|---|
| A. 3-bromobenzoyl | 200–202 |
| B. 3,4-dichlorobenzoyl | 201–203 |
| C. 4-ethoxybenzoyl | 216–217 |
| D. 4-methoxybenzoyl | 205–206 |
| E. 4-methylbenzoyl | 217–218 |
| F. 2-chlorobenzoyl | 208–209 |
| G. 3,5-dimethylbenzoyl | 198–199 |

The above hydrochloride salts melted with decomposition in each case.

EXAMPLE 11

Following the procedure of Example 5, (A) 4-fluorobenzoic acid, (B) 2-thiophenecarboxylic acid, (C) isonicotinic acid and (D) trimethylacetic acid were individually reacted with thionyl chloride to produce the corresponding acid chlorides and the latter were reacted with equimolar proportions of N-aminoephedrine in the presence of pyridine and worked up as in said example to produce, respectively, the following substituted hydrazines as white, crystalline solids:

(A) 1-methyl-1(1-methyl-2-hydroxy-2-phenylethyl)-2(4-fluorobenzoyl) hydrazine, melting at 139°–140° C.,
(B) 1-methyl-1(1-methyl-2-hydroxy-2-phenylethyl)-2(2-thienylcarbonyl) hydrazine, melting at 149°–151° C.,
(C) 1-methyl-1(1-methyl-2-hydroxy-2-phenylethyl)-2-(isonicotinoyl) hydrazine, melting at 141°–142° C., and
(D) 1-methyl-1(1-methyl-2-hydroxy-2-phenylethyl)-2-trimethylacetyl) hydrazine, melting at 120°–122° C.

The isonicotinoyl derivative described above differs from the other acyl hydrazines of the invention in that mineral acid salts thereof, such as 1-methyl-1(1-methyl-2-hydroxy-2-phenylethyl)-2(isonicotinoyl) hydrazine hydrochloride, have substantial solubility in water. Similarly, the unsubstituted N-aminoephedrines and their mineral acid salts have appreciable solubility in water.

In similar fashion, 4-tertiarybutylbenzoic acid is converted to 4-tertiarybutylbenzoyl chloride and the latter is reacted with N-aminoephedrine in the presence of pyridine to produce 1-methyl-1(1-methyl-2-hydroxy-2-phenylethyl)-2(4-butylbenzoyl) hydrazine as a crystalline solid having a molecular weight of about 340. Likewise, 4-butoxybenzoyl chloride is reacted with N-aminoephedrine to produce 1-methyl-1(1-methyl-2-hydroxy -2-phenyl-ethyl)-2(4-butoxybenzoyl) hydrazine hydrochloride as a white, crystalline solid, melting above 200° C.

Similarly, 2-furoyl chloride was added to a solution of N-aminoephedrine in benzene and the mixture heated under reflux and cooled to precipitate a 1-methyl-1(1-methyl-2-hydroxy-2-phenylethyl)-2(2 - furoyl) hydrazine hydrochloride product. The latter was separated by filtration, washed and air-dried and was found to melt at 184°–185° C. with decomposition.

The terms "lower alkyl" and "lower alkoxy" as employed in the present specification and claims, refer to such radicals containing from 1 to 4 carbon atoms, inclusive.

I claim:

1. An N-acylamino-ephedrine in which the acyl group has the formula:

wherein Z is selected from the group consisting of tertiary butyl, pyridyl, thienyl, furyl, unsubstituted phenyl and phenyl substituted with from one to three substituents selected from the group consisting of fluorine, chlorine, bromine, lower alkyl and lower alkoxy.

2. 1-methyl - 1(1-methyl-2-hydroxy - 2 - phenylethyl)-2(4-methoxybenzoyl) hydrazine.

3. 1-methyl - 1(1-methyl - 2 - hydroxy-2-phenylethyl)-2(4-chlorobenzoyl) hydrazine.

4. 1 - methyl-1(1-methyl-2-hydroxy - 2 - phenylethyl)-2(isonicotinoyl) hydrazine.

5. 1- methyl-1(1-methyl - 2 - hydroxy-2-phenylethyl)-(4-methylbenzoyl) hydrazine.

References Cited in the file of this patent

UNITED STATES PATENTS

| 2,953,570 | Rudner | Sept. 20, 1960 |
| 2,957,873 | Rudner | Oct. 25, 1960 |
| 3,072,713 | Guttmann | Jan. 8, 1963 |

FOREIGN PATENTS

| 874,198 | Great Britain | Aug. 2, 1961 |

OTHER REFERENCES

Frieser et al.: "Organic Chemistry," 3rd Edition, pages 237–9, Reinhold (1956).